United States Patent
Gloger et al.

(10) Patent No.: US 6,996,253 B2
(45) Date of Patent: Feb. 7, 2006

(54) PROCESS AND DEVICE FOR IMPROVING THE VISIBILITY IN VEHICLES

(75) Inventors: Joachim Gloger, Bibertal (DE); Werner Ritter, Ulm (DE)

(73) Assignee: DaimlerChrysler AG, (DE)

( * ) Notice: Subject to any disclaimer, the term of this patent is extended or adjusted under 35 U.S.C. 154(b) by 526 days.

(21) Appl. No.: 10/143,152

(22) Filed: May 10, 2002

(65) Prior Publication Data

US 2002/0172400 A1  Nov. 21, 2002

(30) Foreign Application Priority Data

May 17, 2001 (DE) ................................ 101 24 005

(51) Int. Cl.
*G06K 9/00* (2006.01)
(52) U.S. Cl. ...................... 382/104; 382/162; 382/274
(58) Field of Classification Search ................ 382/104, 382/162, 167, 270, 274; 348/118, 122, 164; 340/937; 250/330
See application file for complete search history.

(56) References Cited

U.S. PATENT DOCUMENTS

| | | | | |
|---|---|---|---|---|
| 5,001,558 A | * | 3/1991 | Burley et al. | 348/164 |
| 5,619,036 A | * | 4/1997 | Salvio et al. | 250/330 |
| 6,150,930 A | * | 11/2000 | Cooper | 340/435 |
| 6,792,136 B1 | * | 9/2004 | Niesen | 382/118 |
| 2002/0130953 A1 | * | 9/2002 | Riconda et al. | 348/115 |

FOREIGN PATENT DOCUMENTS

DE   40 07 646 A1   3/1990

* cited by examiner

*Primary Examiner*—Phuoc Tran
(74) *Attorney, Agent, or Firm*—Pendorf & Cutliff

(57) ABSTRACT

The invention concerns a device for improving the view in vehicles, in particular at night, bad weather and fog. In the process images of actual traffic scenes are recorded by a camera (2), which is sensitive outside the visible spectrum, and these images are reproduced in the visible spectrum in the vehicle via a display optic (6). According to the invention the type of object which is contained in a traffic scene recorded by the camera (2) is automatically classified according to type, and depending upon the type of the recognized object it is reproduced on the display optic (6) in an intensity and/or color, which corresponds to the intensity and/or color which the associated object typically has by daylight. The process facilitates the recognition by the vehicle operator of images of traffic scenes recorded outside the visible spectrum.

8 Claims, 1 Drawing Sheet

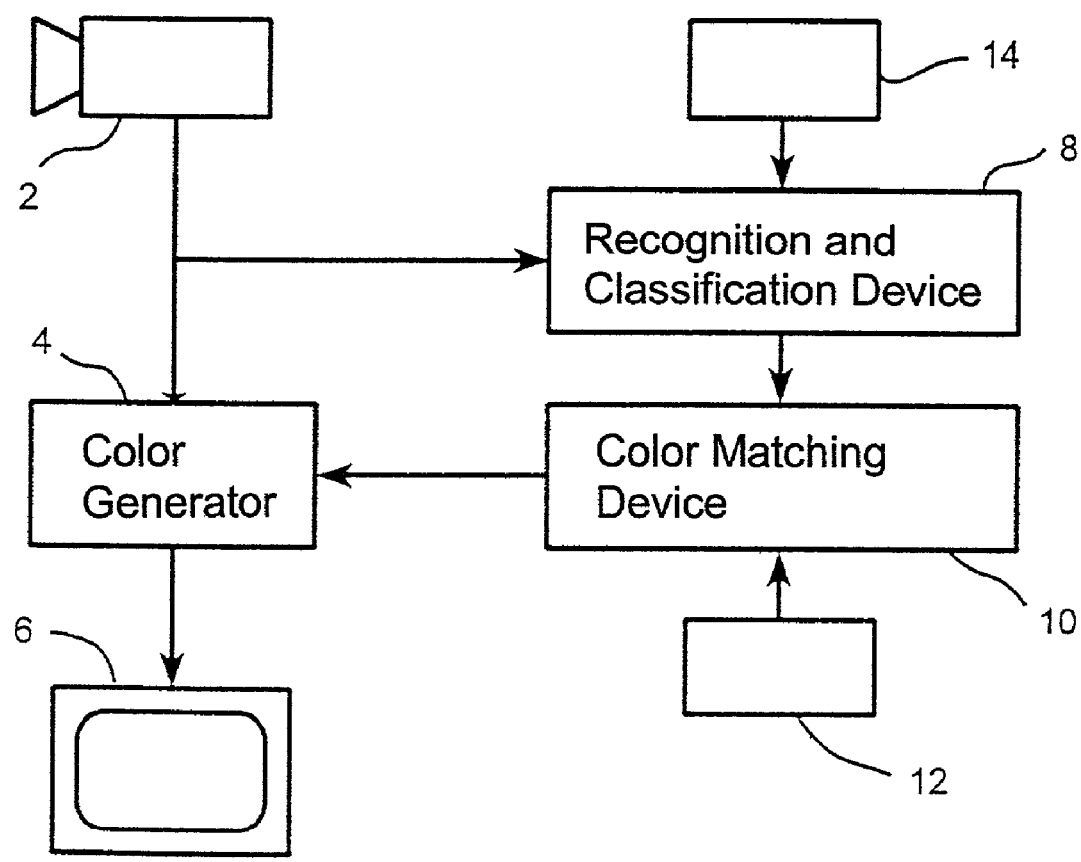

PROCESS AND DEVICE FOR IMPROVING THE VISIBILITY IN VEHICLES

BACKGROUND OF THE INVENTION

1. Field of the Invention

The invention concerns a process and a device for improving the visibility in vehicles, in particular at night, bad weather and fog. The process facilitates the recognition by the vehicle operator of images of traffic scenes recorded outside the visible spectrum.

2. Description of the Related Art

An opto-electronic system for vehicles is disclosed in DE 40 07 646, which includes two infrared headlights in addition to the normal headlights, which infrared headlights use near-infrared emitting laser diodes as light sources. A CCD-camera for taking a video image of the actual traffic scene is mounted in the roof area of the vehicle. The video image is displayed to the vehicle operator on a LCD-display or is projected onto the windshield. The reproduced image contains supplemental information, which the vehicle operator could not see with his own eyes or could only see with great effort, in particular in darkness, bad weather and fog.

The CCD-camera is normally sensitive exclusively or primarily in the infrared, and provides an image in which the objects appear based on their visibility in infrared, which depends—depending upon whether far or near infrared images are taken—more or less upon the temperature of the objects. In order for the operator to better distinguish objects from each other, one could assign different colors to different thermal intensities and display these on a color display, such as described for example in JP 08127286 A1. Such a "thermal image" corresponds essentially to an unchanged spectral distribution of the infrared image of scene shifted into the visible spectrum.

It is proposed in JP 06121325 A1 to employ a camera which is sensitive in multiple different spectral ranges, and to assign to each of these spectral ranges respectively one color, in which color the corresponding partial image is displayed on a color display.

With all known systems the vehicle operator sees the traffic scene however only in pseudo-intensities or, as the case may be, pseudo colors. Such a manner of representing an image is uncustomary and foreign to humans, particularly with images taken in the far infrared. Thus, even a vehicle operator familiar with the system has the burden of processing the information represented in pseudo-intensities or, as the case may be, pseudo-colors, in comparison to color images which are obtained in the visible spectral range.

SUMMARY OF THE INVENTION

It is the task of the present invention to improve the recognizability by the operator of images of traffic scenes recorded outside of the visible spectrum.

This task is solved by a device and a process in which images of actual traffic scenes are recorded by a camera (2), which is sensitive outside the visible spectrum, and these images are reproduced in the visible spectrum in the vehicle via a display optic (6). According to the invention the type of object which is contained in a traffic scene recorded by the camera (2) is automatically classified according to type, and depending upon the type of the recognized object it is reproduced on the display optic (6) in an intensity and/or color, which corresponds to the intensity and/or color which the associated object typically has by daylight. The process facilitates the recognition by the vehicle operator of images of traffic scenes recorded outside the visible spectrum.

The images, as prepared in accordance with the invention, support the vehicle operator in situations in which little or no daylight is available, such as for example night, in a tunnel or in fog or other bad weather, in that they provide to the vehicle operator useful information in familiar shapes or presentations.

BRIEF DESCRIPTION OF THE DRAWINGS

Further characteristics and advantages of the invention can be seen from the following description of illustrative embodiments on the basis of the FIGURE. The single FIGURE shows a general diagram of a device for improving the visibility in vehicles.

DETAILED DESCRIPTION OF THE INVENTION

The device includes a camera 2 as image sensor, which is provided in the roof area of the vehicle, in such a manner, that it records the traffic scene as it would appear viewed in the direction of travel. The camera 2 is sensitive outside the visible range, either in the near infrared and supported by a vehicle mounted infrared headlight, or in the far infrared utilizing background light, or sensitive to ultraviolet light, which is produced by a vehicle associated ultraviolet headlight.

The video image produced by the camera 2 is "monochromic" in this illustrative embodiment, that is, it represents the recorded image with an intensity value which is summed or averaged over the sensitivity spectrum.

The video signal of the camera 2 is supplied to a color generator 4, which assigns to the various intensity values in the video image various RGB-values in accordance with the state of the art, with which a display optic 6 is controlled in the vehicle, which displays the video image to the vehicle operator in pseudo colors.

As described herein, the association of the RGB-values occurs at least in parts of the video image not depending solely upon the image intensity but rather depending supplementally or exclusively upon the type or the object contained in the image.

This occurs thereby, that the video signal of the camera 2 is additionally supplied to a recognition and classification device 8, which searches the traffic scene for objects which correspond to predetermined appearance forms or patterns. Objects important for the purposes of the present invention are for example vehicles, persons, animals, streets, forests, meadows, etc. Information on the basis of which recognition and classification can occur include for example outlines, relative intensities and structures.

If such an object is recognized, then the recognition and classification device 8 sends information regarding the object, in particular the type, outline and position within the video image, to a color matching device 10. The color matching device 10 assigns to the object, on the basis of context information which is stored in a recording medium 12, a color which such an object would typically have by daylight, and drives the color generator 4 to reproduce the object in this color and in an appropriate relative intensity on the display object 6. The stored context information includes for example that meadows in the summer are green, that street surfacing materials are conventionally gray, etc. In cases, in which no general rules apply, for example for the colors of vehicles or the clothing of persons, any selected color can be displayed, in the cases of persons preferably one which is in contrast to colors which frequenly occur in nature.

For the recognition, classification and color matching, additional sources of information can be utilized, as provided by sensors 14 or other information sources which are frequently in any case present in a vehicle, for example, an external thermometer, a clock, a rain sensor, etc. If for example a rain sensor indicates that it is raining, the roadway is displayed on the display optic 6 darker than in the case of dry weather, in order to provide a display which is more true to reality. Or, if a vehicle navigation system is providing information that one is presently driving through a forest area, this information can facilitate the reality matching classification and reproduction of the appropriate image area.

The recognition accuracy and trueness to reality can be further increased in that one employs instead of a "monochrome" camera 2 a "multi-colors"-IR-camera, a camera which provides intensities for different wavelengths for each image point, that is, a more or less detailed spectral distribution. The spectral distribution of a recognized object taken at a particular daytime and weather condition is then transformed or modified by the color matching device 10 on the basis of stored experience values into a daylight spectrum, that is, a spectrum with which the object has a intensity and color, which is as similar as possible to that which the object would have in intensity and color by daylight.

By the appropriate treatment of all relevant objects in the recorded image the vehicle operator sees the environment for example at night in a familiar display on the display optics 6, and namely with details which, under the given environmental conditions, he could not see or could only see with difficulty.

The display optic 6 can be a display on the dashboard or a projector for reflecting the image in the area of the windshield in the manner of a heads up display.

The display optic 6 need not necessarily be color capable; even a monochromic display optic can be controlled in accordance with the above described principles to reproduce IR-images in a manner similar to daylight, wherein only the reproduction intensities of the object are appropriately modified.

As soon as more advanced flat screen displays are available it would also be conceivable to replace the windshield completely by a display as the display optic 6 which in the switched off condition must be transparent. In this case the environment can be displayed at night 1:1 over the total windshield display, so that the vehicle operator has the impression that he is driving by daylight. The above described recognition, classification and color matching of objects in IR-images is considered sufficiently reliable and true to reality in order to make possible such an application.

What is claimed is:

1. A visibility improving device for traffic situation recognition comprising:
    a vehicle mounted headlight emitting radiation outside the visible spectrum,
    a camera (2) sensitive to said radiation outside the visible spectrum, for recording video images of actual traffic scenes,
    a device (8) for recognizing types of objects contained in the traffic scene recorded by the camera (2),
    a device (10, 4) for assigning to a recognized type of object an intensity and/or a color which corresponds to the intensity and/or color which the associated object typically has by daylight, and
    an optical display in the vehicle for reproducing the recorded image representing the traffic situation in the visible spectrum including reproducing recognized types of objects with the intensity and/or the color assigned by the device (10, 4).

2. The visibility improving device as in claim 1, wherein device (8) for recognizing types of objects is programmed to recognize at least one of the following types of object: vehicle, person, animal, street, forest and meadow.

3. The visibility improving device as in claim 1, wherein the device for assigning intensity and/or a color (10, 4) receives location and outline information from said recognition device (8) and assigns color intensity and color to the object within said outline without modifying said outline.

4. The visibility improving device as in claim 1, wherein the device for assigning intensity and/or a color (10, 4) reads object color attributes programmed into an object color attribution memory.

5. The visibility improving device as in claim 4, wherein for color attribution the color matching device (10) receives input from at least one additional input selected from an external thermometer, clock, and rain sensor.

6. A process for improving the visibility in a vehicle, comprising:
    recording an image of an actual traffic scene by means of a camera which is sensitive outside the visible spectrum,
    automatically recognizing types of objects contained in the traffic scene recorded by the camera (2),
    reproducing the recorded image of the actual traffic scene, however in the visible spectrum, within the vehicle on an optical display (6),
    wherein objects recognized by type are reproduced in an intensity and/or color which corresponds to the intensity and/or color which the object typically has during daylight, whereby said display facilitates recognition of the traffic situation.

7. A process as in claim 6, further comprising illuminating the traffic scene with a headlight emitting non-visible light.

8. A process as in claim 6, wherein the outline, relative size, and relative motion of the object is not modified.

* * * * *